(12) United States Patent
Zhao

(10) Patent No.: US 11,861,257 B2
(45) Date of Patent: Jan. 2, 2024

(54) INTERACTION METHOD BETWEEN DISPLAY DEVICE AND TERMINAL DEVICE, STORAGE MEDIUM AND ELECTRONIC DEVICE

(71) Applicant: BOE Technology Group Co., Ltd., Beijing (CN)

(72) Inventor: Xingxing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/641,419

(22) PCT Filed: Mar. 12, 2021

(86) PCT No.: PCT/CN2021/080438
§ 371 (c)(1),
(2) Date: Mar. 8, 2022

(87) PCT Pub. No.: WO2022/188145
PCT Pub. Date: Sep. 15, 2022

(65) Prior Publication Data
US 2023/0161540 A1  May 25, 2023

(51) Int. Cl.
*G06F 3/14* (2006.01)
*G06F 3/0346* (2013.01)
(Continued)

(52) U.S. Cl.
CPC .......... *G06F 3/1454* (2013.01); *G06F 3/0346* (2013.01); *G06F 3/167* (2013.01); *G06T 9/00* (2013.01)

(58) Field of Classification Search
CPC ......... G06F 2203/0382; G06F 3/04845; G06F 3/038; G06F 3/0354; G06F 3/14;
(Continued)

(56) References Cited

U.S. PATENT DOCUMENTS 7,825,896 B2 * 11/2010 Yoshida ................ G06F 3/0481
345/157
9,494,786 B2 * 11/2016 Kimoto ................ G02B 21/367
(Continued)

FOREIGN PATENT DOCUMENTS

CN  101739137 A  6/2010
CN  102221960 A  10/2011
(Continued)

OTHER PUBLICATIONS

Written Opinion of Tiie International Searching Authority in Application No. PCT/CN2021/080438, with English translation, (4p).
(Continued)

*Primary Examiner* — Koosha Sharifi-Tafreshi
(74) *Attorney, Agent, or Firm* — Arch & Lake LLP

(57) ABSTRACT

The present disclosure relates to the field of data interaction technologies, and in particular to an interaction method between a display device and a terminal device, a computer readable storage medium, and an electronic device. The display device includes a multi-device access function, and the method includes: in response to a user's enabling operation on the multi-device access function, generating an access address of the display device; receiving access requests generated and sent by multiple terminal devices according to an access address, and establishing communication connections between the terminal devices and the display device; generating multiple cursors in a one-to-one correspondence with individual terminal devices, and displaying the cursors on a display screen of the display device; and receiving a cursor control instruction sent by the terminal device, and controlling a display position of the cursor on the display screen according to the control instruction.

19 Claims, 5 Drawing Sheets

(51) Int. Cl.
*G06F 3/16* (2006.01)
*G06T 9/00* (2006.01)

(58) Field of Classification Search
CPC .... G06F 3/0346; G06F 3/0481; G06F 3/0383; G06F 3/04812; G06F 2203/0384; G06F 3/03543; G06F 3/033; G02B 21/367; H04N 23/633
See application file for complete search history.

(56) References Cited

U.S. PATENT DOCUMENTS

| | | | |
|---|---|---|---|
| 2002/0059308 A1* | 5/2002 | Kawashima | G06F 16/954 |
| 2004/0189598 A1 | 9/2004 | Fujita et al. | |
| 2009/0322674 A1 | 12/2009 | Fujita et al. | |
| 2010/0033549 A1 | 2/2010 | Sato | |
| 2010/0081375 A1 | 4/2010 | Rosenblatt et al. | |
| 2010/0199191 A1* | 8/2010 | Takahashi | G06F 3/0481 |
| | | | 715/741 |
| 2011/0069007 A1* | 3/2011 | Baxter | G06F 3/0383 |
| | | | 345/158 |
| 2011/0254764 A1 | 10/2011 | Kimoto et al. | |
| 2012/0188052 A1 | 7/2012 | Rosenblatt et al. | |
| 2015/0180919 A1 | 6/2015 | Brunson | |
| 2016/0154478 A1* | 6/2016 | Choi | G06F 3/03542 |
| | | | 345/158 |
| 2017/0038954 A1 | 2/2017 | Kimoto et al. | |
| 2019/0042080 A1 | 2/2019 | Kimoto et al. | |
| 2019/0075456 A1 | 3/2019 | Evans et al. | |
| 2019/0354269 A1 | 11/2019 | Kimoto et al. | |
| 2020/0363938 A1 | 11/2020 | Kimoto et al. | |

FOREIGN PATENT DOCUMENTS

| | | |
|---|---|---|
| CN | 104159149 A | 11/2014 |
| CN | 107483726 A | 12/2017 |
| CN | 107506052 A | 12/2017 |
| CN | 107534704 A | 1/2018 |
| JP | 2012170051 A | 9/2012 |

OTHER PUBLICATIONS

Meng Xiao et al.,"Research and implementation of cooperative mechanism in electronic whiteboard with tablet", Journal of Yunnan University, 2006, 28(s2):PP143-147, CN 53-1045/N, ISSN 0258-7971, (7p).
Partial Supplementary Search Report of EP Application No. 21929620.9 dated May 17, 2023, (11p).
Extended European Search Report issued in Application No. 21929620.9, dated Sep. 5, 2023,(12p).

* cited by examiner

INTERACTION METHOD BETWEEN DISPLAY DEVICE AND TERMINAL DEVICE, STORAGE MEDIUM AND ELECTRONIC DEVICE

CROSS REFERENCE

This application is the 371 application of PCT Application No. PCT/CN2021/080438, filed on Mar. 12, 2021, the entire contents of which are incorporated herein by reference.

TECHNICAL FIELD

The present disclosure relates to the field of data interaction technologies, and in particular, to an interaction method between a display device and a terminal device, a computer readable storage medium, and an electronic device.

BACKGROUND

With the development of display technologies, larger display devices, such as light emitting diode (LED) spliced large projectors, etc., may be used in many scenarios. In these scenarios, when interaction between users and the display devices is required, pointers such as laser pointers are usually used to complete the interaction.

However, the pointers such as the laser pointers cannot achieve a good indication effect on LED devices, liquid crystal display (LCD) devices, and organic light emitting diode (OLED) devices.

It should be noted that the information disclosed in the Background section above is only for enhancing the understanding of the background of the present disclosure, and thus may include information that does not constitute prior art known to those of ordinary skill in the art.

SUMMARY

According to a first aspect of the present disclosure, there is provided an interaction method between a display device and a terminal device, wherein the display device includes a multi-device access function, and the method includes:
  receiving access requests generated and sent by multiple terminal devices according to an access address, and establishing communication connections between the terminal devices and the display device;
  generating multiple cursors in a one-to-one correspondence with individual terminal devices, and displaying the cursors on a display screen of the display device; and
  receiving a cursor control instruction sent by the terminal device, and controlling a display position of the cursor on the display screen according to the control instruction.

According to a second aspect of the present disclosure, there is provided an interaction method between a display device and a terminal device, including:
  performing, by multiple display devices, synchronous display;
  wherein the above-mentioned interaction method between the display device and the terminal device is executable by each of the display devices.

According to a third aspect of the present disclosure, there is provided an interaction method between a display device and a terminal device, including:
  obtaining an access address of the display device, and generating an access request according to the access address and sending it to the display device to establish a communication connection between the terminal device and the display device; and
  in response to a user's control operation on a cursor in a one-to-one correspondence with the terminal device and displayed on a display screen of the display device, generating a control instruction and sending it to the display device, so that a display position of the cursor on the display screen is controlled by the display device according to the control instruction.

According to a fourth aspect of the present disclosure, there is provided an interaction method between a display device and a terminal device, wherein the display device includes a multi-device access function, and the method includes:
  in response to a user's enabling operation on the multi-device access function, generating, by the display device, an access address of the display device;
  obtaining, by the terminal device, the access address of the display device, and generating an access request according to the access address and sending it to the display device to establish a communication connection between the terminal device and the display device;
  generating, by the display device, multiple cursors in a one-to-one correspondence with individual terminal devices, and displaying the cursors on a display screen of the display device;
  generating, by the terminal device, a control instruction and sending it to the display device, in response to a user's control operation on a cursor in a one-to-one correspondence with the terminal device and displayed on the display screen of the display device; and
  receiving, by the display device, a cursor control instruction sent by the terminal device, and controlling a display position of the cursor on the display screen according to the control instruction.

According to a fifth aspect of the present disclosure, there is provided a computer readable medium on which a computer program is stored, wherein the computer program, when executed by a processor, implements the above-mentioned method.

According to a sixth aspect of the present disclosure, there is provided an electronic device, including:
  a processor; and
  a memory configured to store one or more programs, which, when executed by one or more processors, cause the one or more processors to implement the above-mentioned method.

It should be noted that the above general description and the following detailed description are merely exemplary and explanatory and should not be construed as limiting of the disclosure.

BRIEF DESCRIPTION OF THE DRAWINGS

The drawings here are incorporated into the disclosure and constitute a part of the disclosure, show embodiments in accordance with the present disclosure, and are used together with the disclosure to explain the principle of the present disclosure. Obviously, the drawings in the following description are only some embodiments of the present disclosure. For those of ordinary skill in the art, other drawings can be obtained based on these drawings without creative work, in which.

DETAILED DESCRIPTION

Figure 1:
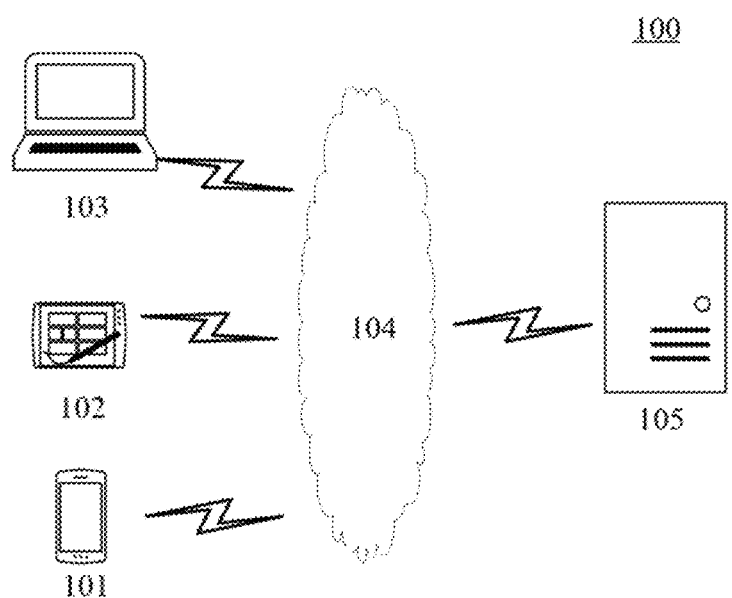
FIG. 1 shows a schematic diagram of an exemplary system architecture to which an embodiment of the present disclosure can be applied.

Exemplary embodiments will now be described more fully with reference to the accompanying drawings. However, the exemplary embodiments can be implemented in a variety of forms and should not be construed as being limited to examples set forth herein; rather, these embodiments are provided so that the present disclosure will be more full and complete so as to convey the idea of the exemplary embodiments to those skilled in this art. The described features, structures, or characteristics may be combined in any suitable manner in one or more embodiments.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

FIG. 1 shows a schematic diagram of a system architecture of an exemplary application environment to which an interaction method and apparatus between a display device and a terminal device according to an embodiment of the present disclosure can be applied.

As shown in FIG. 1, the system architecture 100 may include one or more of terminal devices 101, 102, and 103, a network 104 and a server 105. The network 104 is used to provide a medium for communication links between the terminal devices 101, 102, 103 and the server 105. The network 104 may include various connection types such as wired, wireless communication links, fiber optic cables or the like. The terminal devices 101, 102, and 103 may be electronic devices with data interaction functions, including but not limited to, mouses, desktop computers, portable computers, smart phones, tablet computers, and the like. It should be understood that the number of terminal devices, networks, and servers in FIG. 1 is merely illustrative. According to implementation needs, there can be any number of terminal devices, networks, and servers. For example, the server 105 may be a server cluster composed of multiple servers or the like.

An interaction method between a display device and a terminal device provided by embodiments of the present disclosure can be executed by a processor provided in the display device. Correspondingly, in some embodiments, a user can use the terminal device 101, 102, or 103 to obtain an access address of the display device, and according to the access address, an access request is generated and sent to the display device by the terminal device, so as to establish a communication connection between the terminal device and the display device; in response to a user's control operation on a cursor in a one-to-one correspondence with the terminal device and displayed on a display screen of the display device, a control instruction is generated and sent to the processor in the display device, and the processor completes the interaction with the terminal device 101, 102, or 103 by means of the interaction method between the device and the terminal device provided by the embodiments of the present disclosure.

The embodiments of the present disclosure provide an electronic device for implementing the interaction method between the display device and the terminal device. The electronic device includes at least a processor, a memory, and a display screen, and the memory is configured to store executable instructions by the processor, and the processor is configured to execute the interaction method between the display device and the terminal device by executing the executable instructions.

The electronic device may be a kind of display device. The following takes a display device 200 in FIG. 2 as an example to illustrate a configuration of the display device. It will be understood by those skilled in the art that the configuration in FIG. 2 can also be applied to stationary type devices, except components specifically for mobile purposes. In other embodiments, the display device 200 may include more or less components than shown, or combine some components, or split some components, or have different component arrangements. The illustrated components may be implemented in hardware, software, or a combination of software and hardware. An interface connection relationship between components is only schematically shown, and does not constitute a structural limitation of the display device 200. In further embodiments, the display device 200 may also adopt an interface connection manner different from that shown in FIG. 2, or a combination of multiple interface connection manners.

Figure 2:
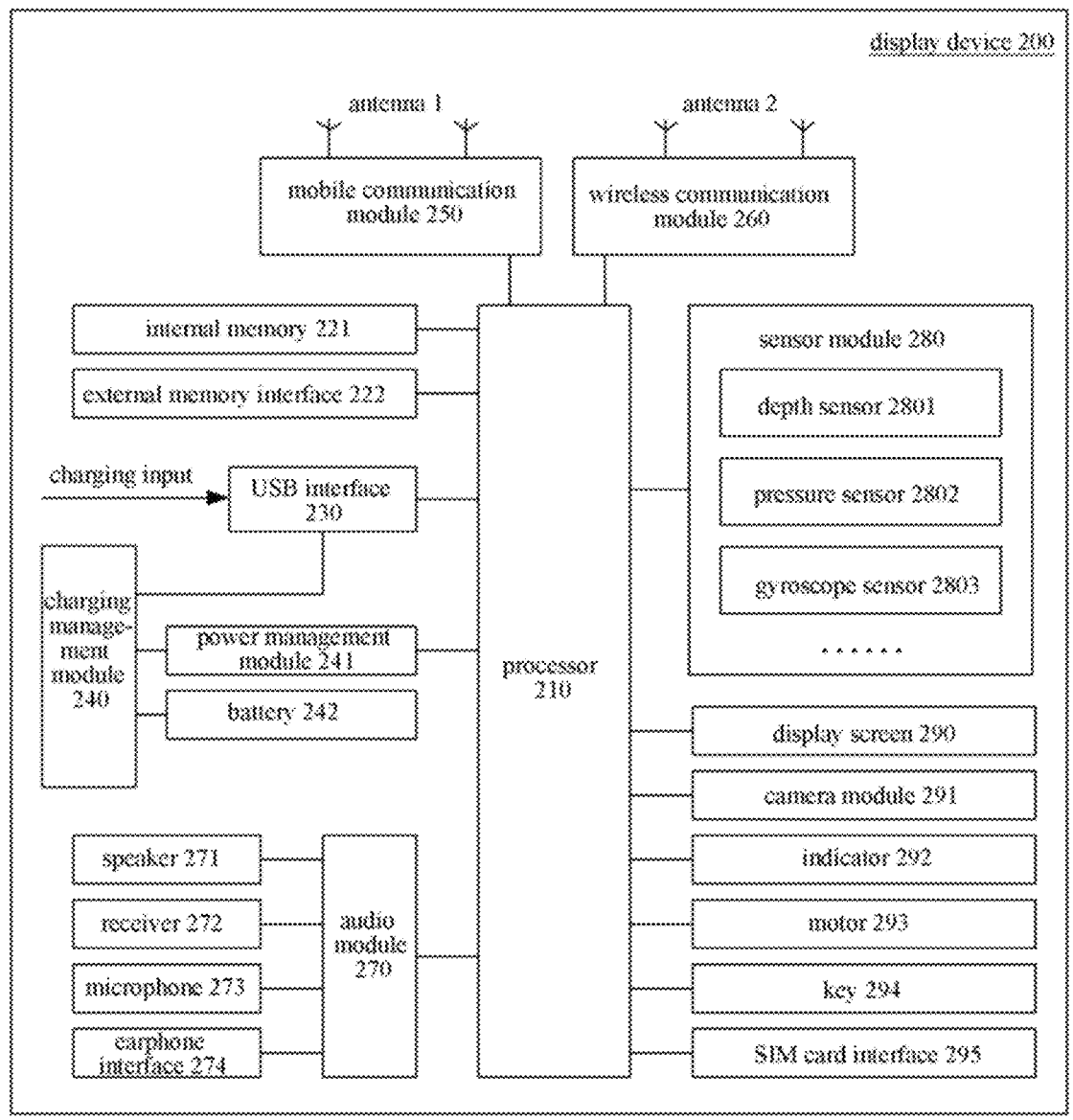
FIG. 2 shows a schematic diagram of a display device to which an embodiment of the present disclosure can be applied.

As shown in FIG. 2, the display device 200 may specifically include: a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, an earphone interface 274, a sensor module 280, a display screen 290, a camera module 291, an indicator 292, a motor 293, a key 294, a subscriber identification module (SIM) card interface 295, and the like, and the sensor module 280 may include a depth sensor 2801, a pressure sensor 2802, a gyroscope sensor 2803, and the like.

The processor 210 may include one or more processing units, for example, the processor 210 may include an application processor (AP), a modem processor, a graphics processing unit (GPU), an image signal processor (ISP), a controller, a video codec, a digital signal processor (DSP), a baseband processor and/or a neural-network processing unit (NPU), etc. Different processing units may be separate devices, or may be integrated in one or more processors.

The NPU is a neural-network (NN) computing processor. With reference to a biological neural network structure, such as a transmission mode between neurons in the human brain, the NPU can quickly process input information and can continuously learn by itself. Applications such as intelligent cognition of the display device 200 can be implemented through the NPU, such as image recognition, face recognition, speech recognition, text understanding, and the like.

The memory is provided in the processor 210. The memory can store instructions for implementing six modular functions: detection instructions, connection instructions, information management instructions, analysis instructions, data transmission instructions, and notification instructions, and the execution of these instructions is controlled by the processor 210.

The charging management module 240 is configured to receive a charging input from a charger. The power management module 241 is configured to couple the battery 242, the charging management module 240 with the processor 210. The power management module 241 receives the input from the battery 242 and/or the charging management module 240, and supplies power to the processor 210, the internal memory 221, the display screen 290, the camera module 291, the wireless communication module 260, and the like.

A wireless communication function of the display device 200 may be implemented by the antenna 1, the antenna 2, the mobile communication module 250, the wireless communication module 260, the modem processor, the baseband processor, and the like. The antenna 1 and the antenna 2 are used to transmit and receive electromagnetic wave signals; the mobile communication module 250 can provide a wireless communication scheme including 2G/3G/4G/5G applied to the display device 200; the modem processor can include a modulator and a demodulator; the wireless communication module 260 can provide a wireless communication scheme including wireless local area networks (WLAN) (such as wireless fidelity (Wi-Fi) networks, Bluetooth (BT)) applied to the display device 200. In some embodiments, the antenna 1 of the display device 200 is coupled to the mobile communication module 250, the antenna 2 is coupled to the wireless communication module 260, so that the display device 200 can communicate with the network and other devices through wireless communication technologies.

The display device 200 implements a display function through the GPU, the display screen 290, the application processor, and the like. The GPU is a microprocessor for image processing, and is coupled to the display screen 290 and the application processor. The GPU is configured to perform mathematical and geometric calculations for graphics rendering. The processor 210 may include one or more GPUs that execute program instructions to generate or alter display information.

The display device 200 may implement a shooting function through the ISP, the camera module 291, the video codec, the GPU, the display screen 290, the application processor, and the like. The ISP is configured to process data fed back by the camera module 291; the camera module 291 is configured to capture still images or videos; the digital signal processor is configured to process digital signals, and can also process other digital signals, in addition to processing digital image signals; and the video codec is configured to compress or decompress a digital video. The display device 200 may also support one or more video codecs.

The external memory interface 222 can be configured to be coupled to an external memory card, such as a Micro SD card, to expand a storage capacity of the display device 200. The external memory card communicates with the processor 210 through the external memory interface 222 to realize a data storage function. In some embodiments, files such as music files and video files are saved in the external memory card.

The internal memory 221 may be configured to store computer executable program codes, which include instructions. The internal memory 221 may include a program storage area and a data storage area. The program storage area can store an operating system, an application program required for at least one function (such as a sound play function, an image play function, etc.), and the like. The data storage area may store data (such as audio data, phone book, etc.) created during the use of the display device 200 and the like. In addition, the internal memory 221 may include a high-speed random access memory, and may also include a non-volatile memory, such as at least one magnetic disk storage device, flash memory device, universal flash storage (UFS), and the like. The processor 210 executes various functional applications and data processing of the display device 200 by running instructions stored in the internal memory 221 and/or instructions stored in the memory provided in the processor.

The display device 200 may implement an audio function through the audio module 270, the speaker 271, the receiver 272, the microphone 273, the earphone interface 274, the application processor, and the like, such as music play, recording, etc.

The depth sensor 2801 is configured to acquire depth information of a scene. In some embodiments, the depth sensor may be disposed in the camera module 291.

The pressure sensor 2802 is configured to sense a pressure signal, and can convert the pressure signal into an electrical signal. In some embodiments, the display screen 290 may be provided with the pressure sensor 2802. There are many kinds of pressure sensors 2802, such as a resistive pressure sensor, an inductive pressure sensor, a capacitive pressure sensor, and the like.

The gyroscope sensor 2803 may be configured to determine a motion attitude of the display device 200. In some embodiments, angular velocities of the display device 200 about three axes (i.e., x, y, and z axes) can be determined by the gyroscope sensor 2803. The gyroscope sensor 2803 can be used for image stabilization, navigation, and somatosensory game scenes.

In addition, sensors with other functions can also be provided in the sensor module 280 according to actual needs, such as an air pressure sensor, a magnetic sensor, an acceleration sensor, a distance sensor, a proximity light sensor, a fingerprint sensor, a temperature sensor, a touch sensor, an ambient light sensor, and a bone conduction sensor, etc.

Other devices that provide auxiliary functions may also be included in the display device 200. For example, the key 294 includes a power key, a volume key, etc., through which key signals related to the user setting and function control of the display device 200 can be input and generated by the user. In addition, the indicator 292, the motor 293, the SIM card interface 295, and the like may also be included.

In the related art, prices of LED spliced devices and large-size LCD devices are gradually decreasing at present, and such devices gradually replace traditional projectors in conference room scenes. However, traditional pointing devices such as laser pointers have little display effect on the LED spliced devices and the LCD devices. LED spliced black matrixes may absorb a large amount of laser brightness, and brightness of a display area is much greater than that of the laser pointer, and the laser spot is not obvious; an influence of polarization of the LED results in very little reflected laser, and the laser spot is very weak. In a multi-person conference scene, the use of a device such as the laser pointer and an mouse can only realize single device-to-single device control. When multiple persons want to perform pointing, multiple air mice need to be coupled or the laser pointer is passed between these persons, which affects the user experience.

The interaction method between the display device and the terminal device according to an embodiment of the present disclosure will be specifically described below.

Figure 3:
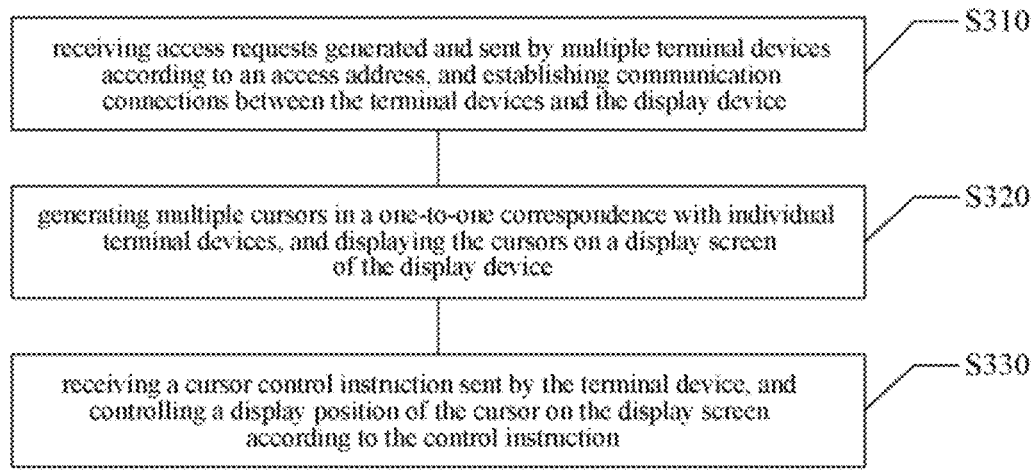
FIG. 3 schematically shows a flowchart of an interaction method between a display device and a terminal device executed by a processor of a display device according to an embodiment of the present disclosure.

FIG. 3 shows a flowchart of an interaction method between a display device and a terminal device according to an embodiment of the present disclosure, which can be executed by the electronic device, such as the above-mentioned display device 200, which is not limited to this, and the interaction method includes the following steps:

in step S310, access requests generated and sent by multiple terminal devices according to an access address are received; and communication connections between the terminal devices and the display device are established;

in step S320, multiple cursors in a one-to-one correspondence with individual terminal devices are generated, and the cursors are displayed on a display screen of the display device; and in step S330, a cursor control instruction sent by the terminal device is received, and a display position of the cursor on the display screen is controlled according to the control instruction.

Compared with the prior art, the display device in the present disclosure can be accessed by the multiple terminals at the same time, and generate the cursor corresponding to the terminal device, and the user can control the display position of the cursor on the display screen of the display device through the terminal device. The terminal device is used to control the cursor position to complete the interaction, the indication is clear, and there may be the multiple cursors at the same time, which is convenient for interaction and improves the user experience.

In the step S310, the access requests generated and sent by the multiple terminal devices according to the access address are received; and the communication connections between the terminal devices and the display device are established.

In some embodiments of the present disclosure, the display device can be provided with a multi-device access function. In response to a user's enabling operation on the multi-device access function, the access address of the display device is generated. The enabling operation may be that the user enables the multi-device access function through a voice recognition function of the display device, or the user enables the multi-device access function through a triggering operation on an enabling identification set on the display device, or the user enables the multi-device access function by means of the mouse or the keyboard, which is not specifically limited by the embodiments of the present disclosure.

In some embodiments of the present disclosure, the access address may be displayed in the form of an encoded image, such as a two-dimensional code, a barcode, etc., and the form of the access address is not specifically limited by the embodiments of the present disclosure.

In some embodiments of the present disclosure, the display device receives the access request generated and sent by the terminal device according to the access address, and establishes the communication connection between the terminal device and the display device. The communication connection between the terminal device and the display device can be established through a local area network; or the communication connection between the terminal device and the display device can be established through a cloud server.

Specifically, when the access address is the encoded image, the terminal device can decode the encoded image and generate the access request. For example, the encoded image is the two-dimensional code, and the terminal device can scan the two-dimensional code to generate the access request, and then the communication connection between the terminal device and the display device is established.

The terminal device can scan the two-dimensional code by using a third-party platform, which can be an existing commonly used third-party platform, such as WeChat, QQ, etc., or by using an independently developed application (APP), which is not specifically limited by the embodiments of the present disclosure. Specifically, the APP for establishing the communication connection between the terminal device and the display device is independently developed, and the encoded image is decoded and the access request is generated by means of this APP. The terminal device sends the access request to the display device, so that the terminal device can establish the communication connection with the display device.

In the step S320, the multiple cursors in the one-to-one correspondence with the individual terminal devices are generated, and the cursors are displayed on the display screen of the display device.

In some embodiments of the present disclosure, after the communication connection between the terminal device and the display device is established, the processor of the display device generates the multiple cursors in the one-to-one correspondence with the individual terminal devices, and displays the cursors on the display screen of the display device.

In some embodiments of the present disclosure, when the multiple cursors in the one-to-one correspondence with the individual terminal devices are generated, a cursor display identifier may be set on the display device. After the user triggers the cursor display identifier, a cursor corresponding to a terminal device is generated on the display device. Each terminal device may correspond to one cursor display identifier, for example, the cursor display identifier corresponding to the terminal device may be set below a terminal identifier of the terminal device; or multiple terminal devices may correspond to one cursor display identifier; or all terminal devices only correspond to one cursor display identifier. A display position of the cursor display identifier can be customized according to user requirements, which is not specifically limited by the embodiments of the present disclosure.

In some embodiments of the present disclosure, a cursor display request sent by the terminal device may be received by the display device, and the cursor corresponding to the terminal device may be generated on the display device. The cursor display request may be generated by the user operating the terminal device and sent to the display device. For example, a cursor display switch is set on the terminal device, and in response to a user's triggering operation on the cursor display switch, the cursor display request can be generated and sent to the display device.

In an embodiment, when the cursor is initially generated, the cursor can be displayed in a designated area of the display screen of the display device, such as a set area in the upper left corner of the display screen, a set area in the lower right corner of the display screen, etc., which is not specifically limited by the embodiments of the present disclosure.

In an embodiment, a shape of the cursor may be an arrow, a circle, etc., or may be other shapes such as a finger, a triangle, etc., and may also be customized according to the user requirements.

Figure 4:
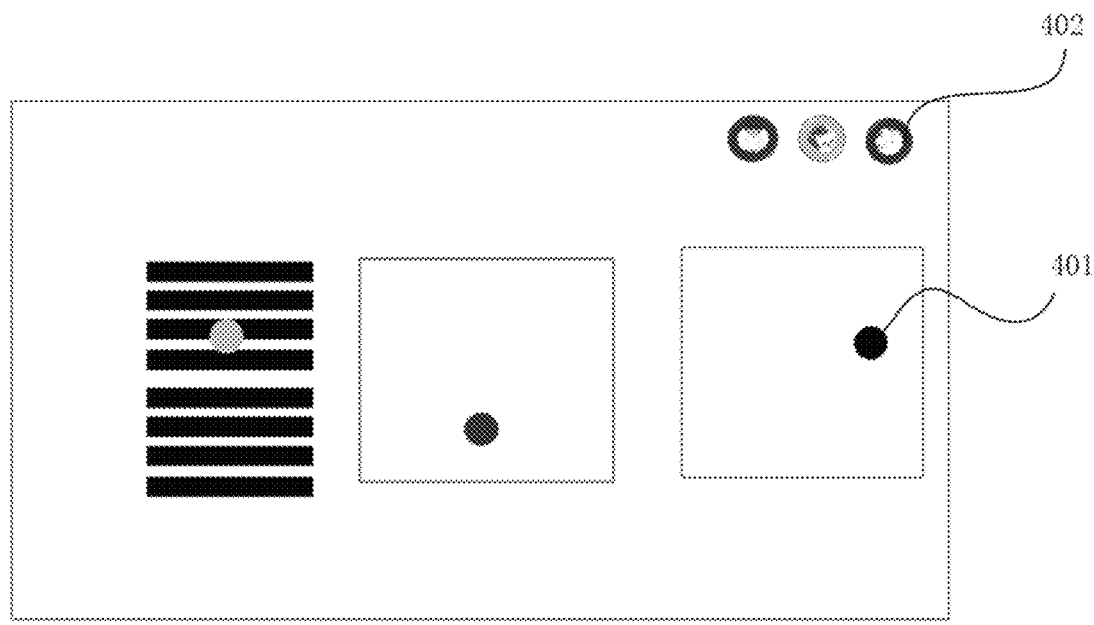
FIG. 4 schematically shows a schematic diagram of content displayed by a display device according to an embodiment of the present disclosure.

In an embodiment, referring to FIG. 4, the generated cursors 401 of the multiple terminal devices can be displayed differently. For example, for different terminal devices, colors of the corresponding cursors 401 on the display devices are different, or for different terminal devices, shapes of the corresponding cursors 401 on the display devices are different, or for different terminal devices, the corresponding cursors 401 on the display devices include different ID numbers. For example, the cursor 401 includes an ID number corresponding to the terminal device, the cursor 401 is numbered in the form of numbers and the resulting number is added to the lower right corner of the cursor 401 to distinguish the cursors 401 belonging to different terminal devices, which is not specifically limited by the embodiments of the present disclosure.

In some embodiments of the present disclosure, authority levels may be set for different terminal devices, and then an operation authority that the user can perform on the display device through the terminal device may be determined according to the authority level.

In an embodiment, the authority levels can be classified according to the personnel corresponding to the terminal devices, and the personnel can be specifically classified into a moderator, an advanced participant and an ordinary participant. The authority levels can be classified as follows: the moderator has all authorities, the advanced participant has a control authority, and the ordinary participant only has a cursor authority.

In some embodiments of the present disclosure, the classification of the authority levels can be implemented according to rules set by the processor of the display device. For example, a user of a terminal device that first accesses to the display device is regarded as the moderator, users of the second to Nth terminal devices that access to the display device are regarded as the advanced participants and users of terminal devices that access to the display device after the Nth terminal device are regarded as the ordinary participants. In other embodiments, the classification of the authority levels can be set by the user, that is, the user sets classes of the personnel corresponding to individual terminal devices, and gives corresponding authority levels to different persons. Reference may be made to the table below for the specific classification of the authority levels and the corresponding authority.

| Authority Class | Cursor | Page Turn | Annotation | Esc | Authority Setting |
| --- | --- | --- | --- | --- | --- |
| Moderator | ✓ | ✓ | ✓ | ✓ | ✓ |
| Advanced Participant | ✓ | ✓ | ✓ | | |
| Ordinary Participant | ✓ | | | | |

That is, the moderator who has all the authorities can use the terminal device to control the cursor 401 corresponding to the terminal device to perform operations such as page turn, annotation, exiting, and authority setting on the display device. The advanced participant who has the control authority can perform operations such as page turn, and annotation on the display device through the cursor 401 corresponding to the terminal device of the advanced participant. The ordinary participant who has the cursor 401 authority can control the display position of the corresponding cursor 401 on the display screen of the display device through the terminal device.

In some embodiments of the present disclosure, the page turn operation may be to switch content currently displayed on the display screen, the annotation operation may be to add partial content to the currently displayed content, the exiting operation may be to turn off the display of the currently displayed content by the display device, and the authority setting operation may be to change the authority level of each terminal device.

In some embodiments of the present disclosure, referring to FIG. 4, after the communication connection is established, a terminal identifier 402 in the one-to-one correspondence with a terminal device can be generated and displayed at a preset position of the display screen. The preset position can be the upper right corner of the display screen, may also be right above the display screen, and may also be customized according to the user requirements, which is not specifically limited by the embodiments of the present disclosure.

In some embodiments of the present disclosure, the terminal identifier 402 may include attribute information of the terminal device. For example, the terminal identifier 402 includes avatar information set by the user corresponding to the terminal device so as to distinguish different terminal devices represented by respective terminal identifiers 402.

In some embodiments of the present disclosure, voice interaction can also be performed between the display device and the terminal device. The display device can receive and play voice information sent by the terminal device. When playing the voice information sent by the terminal device, the display device can display the terminal identifier 402 corresponding to the current terminal device in a differentiated manner. For example, a speaker logo is set in the lower right corner of the terminal identifier 402 corresponding to the terminal device, or a frame is set on the periphery of the terminal identifier 402, or the display of the terminal identifier 402 corresponding to the terminal device can be customized according to the user requirements, which is not specifically limited by the embodiments of the present disclosure.

In some embodiments of the present disclosure, the display device can receive and play the voice information sent by the terminal device, and when playing the voice information sent by the terminal device, the display device can generate a play mark on the cursor corresponding to the current terminal device, so that other users can be aware of a source of the voice information, thereby improving the user experience.

In the step S340, the cursor control instruction sent by the terminal device is received, and the display position of the cursor on the display screen is controlled according to the control instruction.

In some embodiments of the present disclosure, the user can send the cursor 401 control instruction to the processor of the display device through the terminal device, and the processor can control the display position of the cursor 401 on the display screen according to the cursor 401 control instruction.

In some embodiments of the present disclosure, the terminal device may be a device with an interactive control function, such as a mouse, a notebook computer, a mobile phone, etc., and the terminal device may include the gyroscope. The control instruction includes data information of the terminal device collected by the gyroscope, the terminal device sends the data information to the display device, and the display device controls the display position of the cursor 401 on the display screen according to the data information.

Specifically, the gyroscope can obtain accelerations of the terminal device along three axes of x, y, and z directions in a coordinate system, and a sampling frequency is set. When the terminal device moves, all the three accelerations may change. First, there is an initial value, that is, the gravitational acceleration g, for an value of the acceleration. An acceleration a' decomposed on a plane perpendicular to a direction of the gravitational acceleration is used as an acceleration of the cursor movement. Due to the error generated by the gyroscope, data filtering can be performed on the acceleration, and then time integration of the acceleration a' can be used to obtain a movement distance; finally, the movement distance can be normalized to be converted to the number of movement pixels. Then, the number of movement pixels, that is, movement data, is transmitted to the processor of the display device, and then the processor of the display device controls the display position of the cursor according to the movement data.

In other embodiments of the present disclosure, the terminal device has a display function, and content displayed on the terminal device is synchronized with content displayed on the display device. After the communication connection between the terminal device and the display device is established, the user can move the display position of the cursor corresponding to the terminal device by means of the terminal device, thereby moving the display position of the cursor corresponding to the terminal device on the display device.

Figure 5:
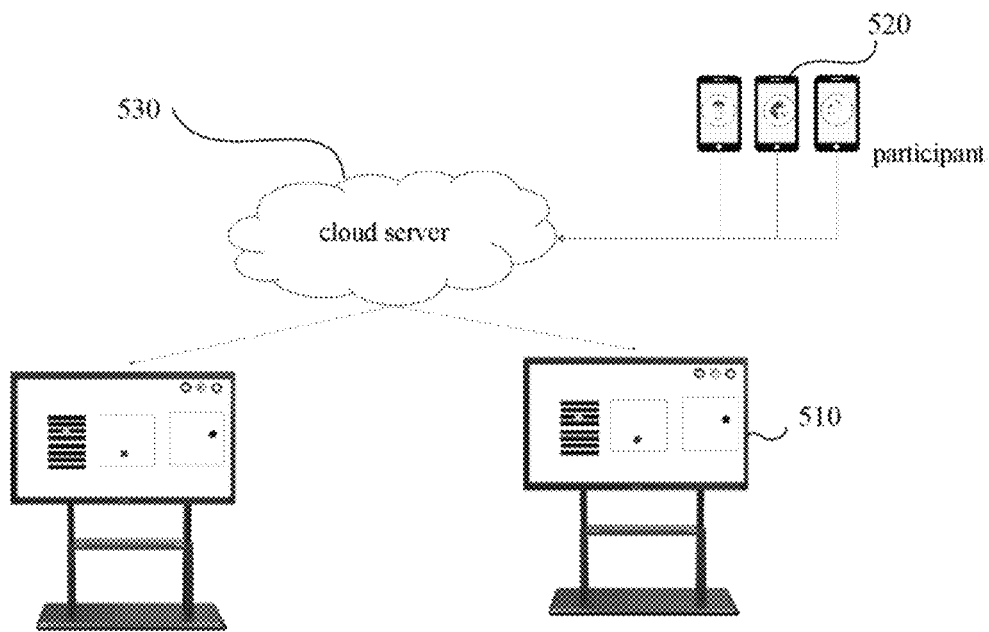
FIG. 5 schematically shows a schematic diagram of interaction between multiple display devices and multiple terminal devices according to an embodiment of the present disclosure.

In some embodiments of the present disclosure, the present disclosure also provides an interaction method between a display device 510 and a terminal device 520. Referring to FIG. 5, multiple display devices 510 may be included, and the multiple display devices 510 display synchronously, that is, contents displayed on the multiple display devices 510 are exactly the same, and the contents are synchronized, and each display device 510 can complete the interaction with the terminal device 520. For example, one display device 510 and multiple terminal devices 520 are included at a location A, and one display device 510 and one terminal device 520 are included at a location B, the displayed contents of the two display devices 510 are identical and synchronized. In this case, after the communication connections between the multiple terminal devices 520 at the location A and the display device 510 at the location A are established, the multiple terminal devices 520 at the location A can control the displayed content of the display device 510 at the location A. Since the displayed contents of the two display devices 510 are completely synchronized, the displayed content of the display device 510 at the location B can also be controlled.

In other embodiments of the present disclosure, the displayed contents of the multiple display devices may be partially synchronized. For example, the multiple display devices 510 include display windows corresponding to the same application, the displayed contents in the display windows are completely synchronized, and contents outside the display windows may be displayed asynchronously or synchronously, which is not specifically limited by the embodiments of the present disclosure.

In some embodiments of the present disclosure, cursors corresponding to the same terminal device 520 displayed on the multiple different display devices can be regarded as the same cursor, and when the multiple display devices 510 have all executed the interaction method between the display device and the terminal device, the contents displayed on the multiple different display devices can be completely consistent, and the number of cursors displayed on each display device is the total number of terminal devices coupled to the display devices 510. For example, the number of terminal devices 520 accessing to the display device 510 at the location A is three, the number of terminal devices 520 accessing to the display device 510 at the location B is five. In this case, the display device 510 at the location A and the display device 510 at the location B display the same number of cursors, and both display eight cursors. The number of terminal devices 520 accessing to the display device 510 at the location A is two, the number of terminal devices 520 accessing to the display device 510 at the location B is seven. In this case, the display device 510 at the location A and the display device 510 at the location B display the same number of cursors, and both display nine cursors. The number of terminal devices that can access to each display device 510 can be customized according to the user requirements, which is not specifically limited by the embodiments of the present disclosure.

In some embodiments of the present disclosure, the interaction between the display device 510 and the terminal device 520 located in the same area has been described in detail above, and therefore will not be repeated here.

In some embodiments of the present disclosure, as shown in FIG. 5, the multiple display devices 510 may synchronize the displayed contents through a cloud server 530. Specifically, the multiple display devices 510 are coupled to the same cloud server 530, and the smart terminal can also control the display position of the corresponding cursor on the display device 510 through the cloud server 530.

Figure 6:
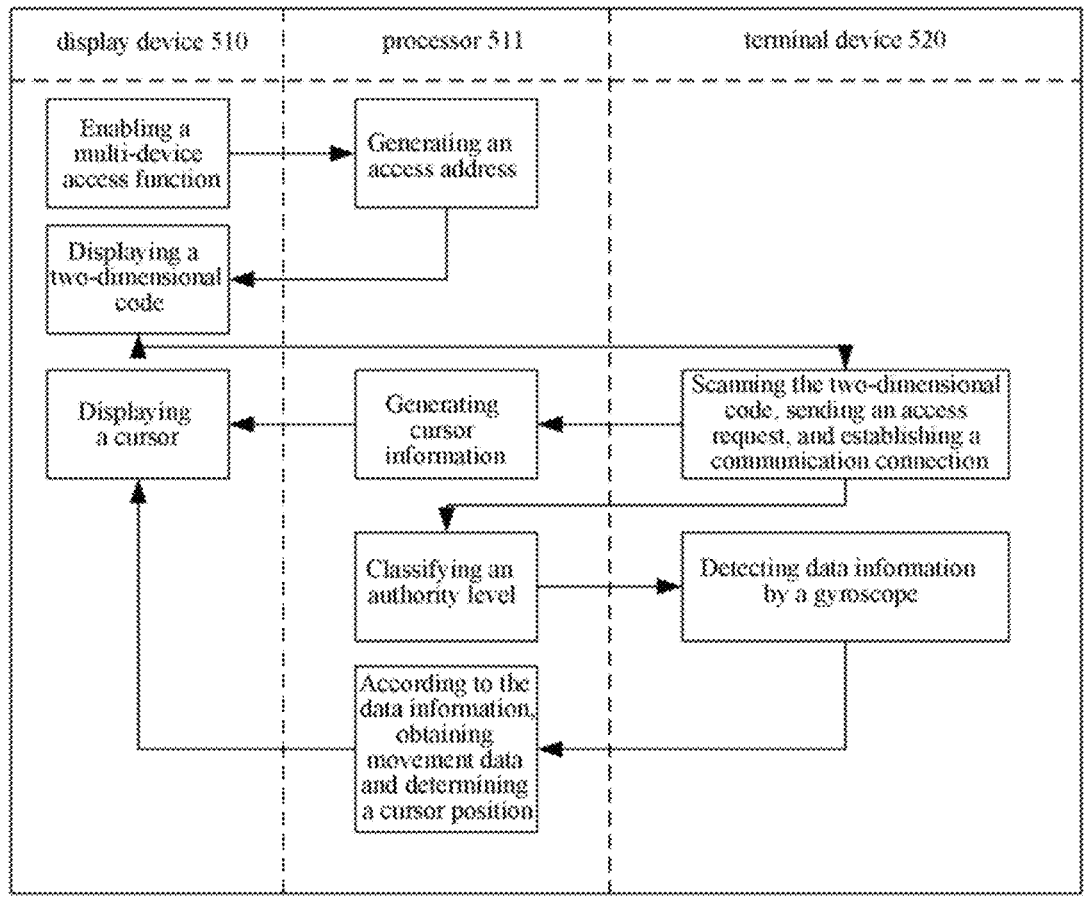
FIG. 6 schematically shows a data flow diagram of interaction between a display device and a terminal device according to an embodiment of the present disclosure.

In some embodiments of the present disclosure, referring to FIG. 6, the solution of the present disclosure is described in detail through a specific embodiment. Specifically, the display device 510 enables the multi-device access function, and then the processor 511 of the display device 510 generates the access address and displays it in the form of the two-dimensional code. The terminal device 520 scans the two-dimensional code and sends the access request to establish the communication connection with the display device 510, and at this time, the cursor in the one-to-one correspondence with the terminal device 520 can be displayed on the display device 510. Then, the processor 511 classifies the authority levels, the gyroscope of the terminal device 520 detects the data information of the terminal device 520, and then the data information is sent to the processor 511. The processor 511 obtains movement data and determines a position of the cursor after movement according to the data information, and finally, the display device 510 displays the cursor at the designated position. There may be multiple terminal devices 520, such as three, four, or more etc., which is not specifically limited by the embodiments of the present disclosure.

Figure 7:
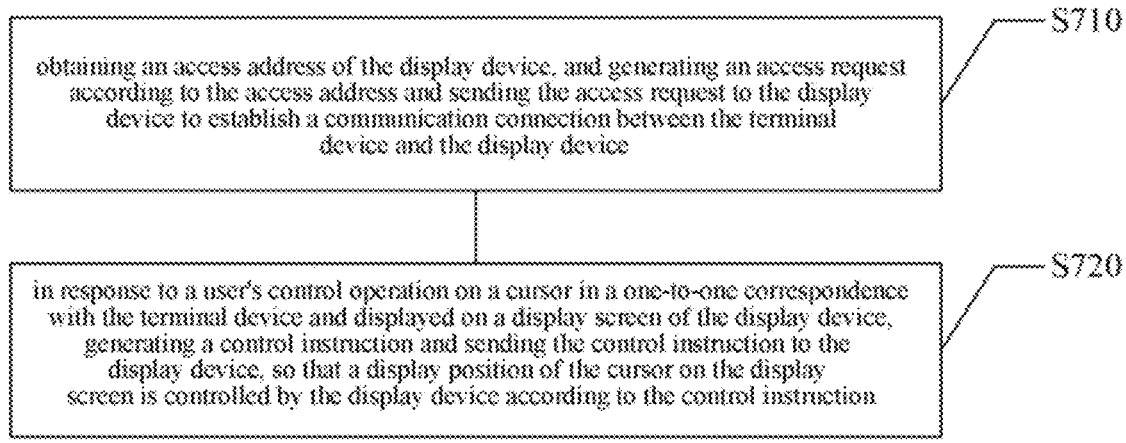
FIG. 7 schematically shows a flowchart of an interaction method between a display device and a terminal device executed by a terminal device according to an embodiment of the present disclosure.

In addition, the present disclosure also provides an interaction method between a display device and a terminal device, as shown in FIG. 7, which can be executed by the terminal device, and specifically may include the following steps:

in step S710, an access address of the display device is obtained, an access request is generated according to the access address and sent to the display device to establish a communication connection between the terminal device and the display device; and in step S720, in response to a user's control operation on a cursor in a one-to-one correspondence with the terminal device and displayed on a display screen of the display device, a control instruction is generated and sent to the display device, so that a display position of the cursor on the display screen can be controlled by the display device according to the control instruction.

In the embodiments of the present disclosure, steps performed by the terminal device have already been described in detail when steps performed by the display device is described, and thus are not repeated here.

Figure 8:
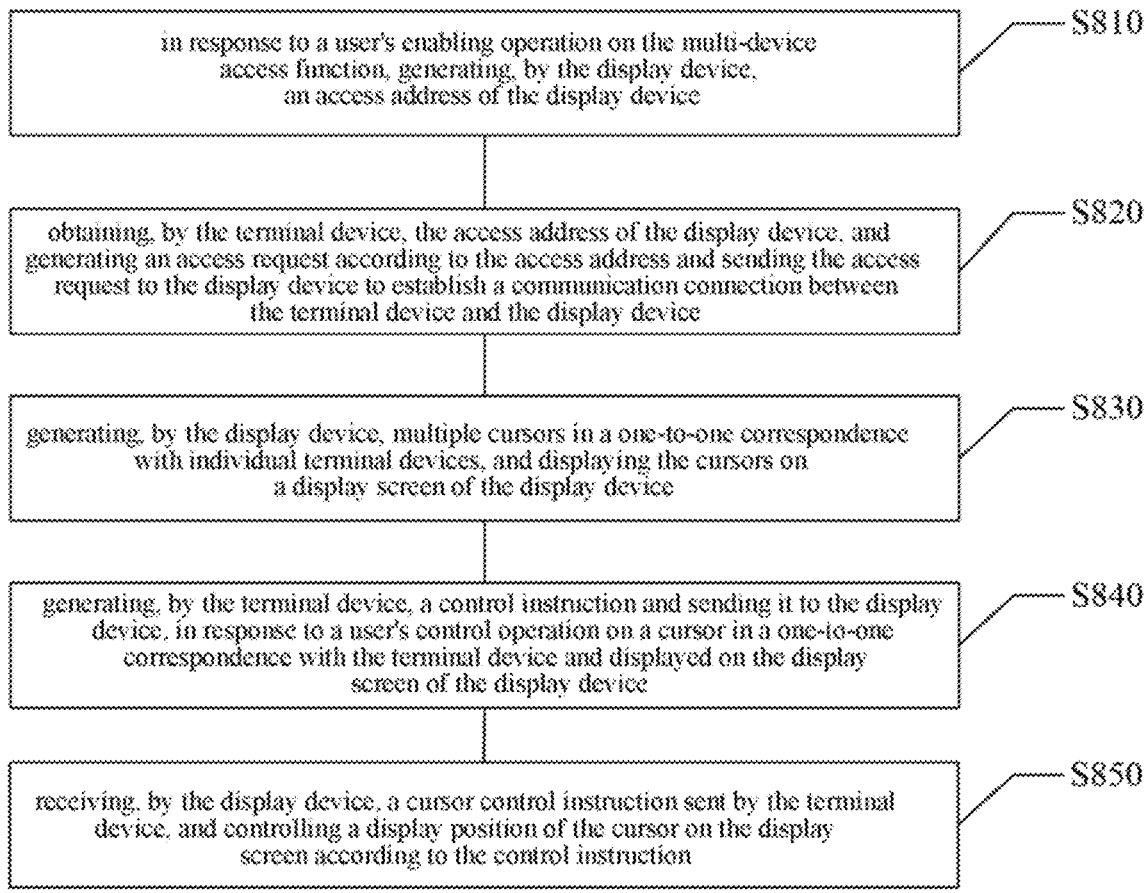
FIG. 8 schematically shows a flowchart of an interaction method between a display device and a terminal device simultaneously executed by a processor of a display device and a terminal device according to an embodiment of the present disclosure.

In addition, the present disclosure also provides an interaction method between a display device and a terminal device. Referring to FIG. 8, the method may include the following steps:

in step S810, in response to a user's enabling operation on the multi-device access function, the display device generates an access address of the display device;

in step S820, the terminal device obtains the access address of the display device, generates an access request according to the access address and sends it to the display device to establish a communication connection between the terminal device and the display device;

in step S830, the display device generates multiple cursors in a one-to-one correspondence with individual terminal devices, and displays the cursors on a display screen of the display device;

in step S840, in response to a user's control operation on a cursor in a one-to-one correspondence with the terminal device and displayed on the display screen of the display device, the terminal device generates a control instruction and sends it to the display device; and in step S850, the display device receives a cursor control instruction sent by the terminal device, and controls a display position of the cursor on the display screen according to the control instruction.

The specific content of each of the above steps has been described in detail above, and therefore, will not be repeated here.

In summary, in the embodiments of the present disclosure, the display device in the present disclosure can be accessed to multiple terminals at the same time, and generate the cursor corresponding to the terminal device, and the user can control the display position of the cursor on the display screen of the display device through the terminal device. The terminal device is used to control the cursor position to complete the interaction, the indication is clear, and there are the multiple cursors at the same time, which is convenient for interaction and improves the user experience.

In addition, it should be noted that the above-mentioned drawings are only schematic illustrations of processes included in the method according to the exemplary embodiment of the present disclosure, and are not intended to limit the purpose. It is understood that the processes shown in the above drawings do not indicate or limit the chronological order of these processes. In addition, for example, it is also understood that these processes may be performed synchronously or asynchronously in multiple modules.

Those skilled in the art may understand that various aspects of the present disclosure may be implemented as a system, method, or program product. Therefore, various aspects of the present disclosure may be embodied in the following forms: a complete hardware implementation, a complete software implementation (including firmware, microcode, etc.), or a combination of hardware and software, which may be collectively referred to herein 'circuit', 'module', or 'system'.

The embodiments of the present disclosure also provide a computer readable storage medium, and a program product capable of implementing the above-mentioned method of the present specification is stored in the computer readable storage medium. In some possible embodiments, aspects of the present disclosure may also be implemented in the form of a program product, which includes program code. When the program product runs on a terminal device, the program code is used to make the terminal device perform the steps according to various exemplary embodiments of the present disclosure described in the above-mentioned "exemplary method" section of this specification.

It should be noted that the computer readable medium shown in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination thereof. More specific examples of the computer readable storage medium include: electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In the present disclosure, the computer readable storage medium may be any tangible medium that contains or stores a program that can be used by or in conjunction with an instruction execution system, apparatus, or device. And in the present disclosure, the computer readable signal medium may include a data signal in baseband or propagated as a part of a carrier wave, which carries computer readable program codes. Such a propagated data signal may take many forms, including but not limited to electromagnetic signals, optical signals, or any suitable combination of the foregoing. The computer readable signal medium may also be any computer readable medium other than a computer readable storage medium, and the computer readable medium may send, propagate, or transmit a program for use by or in combination with an instruction execution system, apparatus, or device. The program code contained in the computer readable medium may be transmitted using any appropriate medium, including but not limited to wireless, wired, optical cable, RF, etc., or any suitable combination of the foregoing.

In addition, the program code for performing the operations of the present disclosure may be written in any combination of one or more programming languages, which include object-oriented programming languages, such as Java, C++, etc. and further include conventional procedural programming language, such as 'C' or a similar programming language. The program code may be executed entirely or partly in the user computing device, may be executed as an independent software package, may be executed partly in the user computing device and partly in the remote computing device, or may be executed entirely in the remote computing device or server. In the case of involving remote computing devices, the remote computing devices may be coupled to the user computing device via any kind of network, such as a local area network (LAN) or a wide area network (WAN), or it may be coupled to external computing devices, for example, coupled to external computing devices via the Internet by use of an Internet service provider.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. An interaction method between a display device and a terminal device, comprising:
    receiving access requests generated and sent by multiple terminal devices according to an access address of the display device, and establishing communication connections between the multiple terminal devices and the display device;
    generating multiple cursors in a one-to-one correspondence with the multiple terminal devices, and displaying the multiple cursors on a display screen of the display device; and
    receiving a cursor control instruction sent by the terminal device, and controlling a display position of a cursor corresponding to the terminal device on the display screen according to the cursor control instruction,
    wherein the method further comprises:
    detecting voice information sent by the terminal device in real time, and generating a play mark on the cursor corresponding to the terminal device when the voice information is received and played.

2. The method according to claim 1, wherein the display device comprises a multi-device access function, and the method further comprises:
    in response to that the multi-device access function is enabled, generating the access address of the display device.

3. The method according to claim 1, wherein the displaying the multiple cursors on the display screen of the display device comprises:
    displaying the multiple cursors in the one-to-one correspondence with the multiple terminal devices on the display screen in a differentiated manner.

4. The method according to claim 1, wherein the method further comprises:
    generating multiple terminal identifiers in the one-to-one correspondence with the multiple terminal devices, and displaying the multiple terminal identifiers at a preset area of the display screen.

5. The method according to claim 1, wherein the receiving the access requests generated and sent by the multiple terminal devices according to the access address of the display device comprises:
    generating an encoded image according to the access address; and
    receiving the access requests generated by the multiple terminal devices decoding the encoded image.

6. The method according to claim 1, wherein the establishing the communication connections between the multiple terminal devices and the display device comprises:
    establishing the communication connections between the multiple terminal devices and the display device through a local area network; or
    establishing the communication connections between the multiple terminal devices and the display device through a cloud server.

7. The method according to claim 1, wherein the display device comprises a cursor display identifier;
    the generating the multiple cursors in the one-to-one correspondence with the multiple terminal devices comprises:
    in response to that the cursor display identifier is triggered, generating the multiple cursors in the one-to-one correspondence with the multiple terminal devices.

8. The method according to claim 1, wherein the generating the multiple cursors in the one-to-one correspondence with the multiple terminal devices comprises:
    receiving cursor display requests sent by the multiple terminal devices, and generating the multiple cursors in the one-to-one correspondence with the multiple terminal devices.

9. The method according to claim 1, wherein the method further comprises:
    setting an authority level for each terminal device, and determining an operation authority that a user is authorized to perform operations on the display device through the terminal device according to the authority level.

10. The method according to claim 1, wherein the method further comprises:
    receiving an operation instruction sent by the terminal device, and performing an operation corresponding to the operation instruction.

11. The method according to claim 1, wherein the terminal device comprises a gyroscope, and the cursor control instruction comprises data information of the terminal device collected by the gyroscope;
    the receiving the cursor control instruction sent by the terminal device, and controlling the display position of the cursor corresponding to the terminal device on the display screen according to the cursor control instruction comprises:
    receiving the data information collected by the gyroscope of the terminal device, and controlling the display position of the cursor corresponding to the terminal device on the display screen according to the data information.

12. An interaction method between a display device and a terminal device, comprising:
    performing, by multiple display devices, synchronous display;

wherein the interaction method between the display device and the terminal device is executable by each display device, and the interaction method comprises:

receiving access requests generated and sent by multiple terminal devices according to an access address of the display device, and establishing communication connections between the multiple terminal devices and the display device;

generating multiple cursors in a one-to-one correspondence with the multiple terminal devices, and displaying the multiple cursors on a display screen of the display device; and receiving a cursor control instruction sent by the terminal device, and controlling a display position of a cursor corresponding to the terminal device on the display screen according to the cursor control instruction, wherein the method further comprises:

detecting voice information sent by the terminal device in real time, and generating a play mark on the cursor corresponding to the terminal device when the voice information is received and played.

13. The method according to claim 12, wherein the multiple display devices are coupled through a cloud server, so that the synchronous display is performed by the multiple display devices.

14. An interaction method between a display device and a terminal device, comprising:

obtaining an access address of the display device, and generating an access request according to the access address and sending the access request to the display device to establish a communication connection between the terminal device and the display device; and in response to a control operation on a cursor in a one-to-one correspondence with the terminal device, generating a cursor control instruction and sending the cursor control instruction to the display device, so that a display position of the cursor on a display screen of the display device is controlled by the display device according to the cursor control instruction, wherein the method further comprises:

detecting voice information sent by the terminal device in real time, and generating a play mark on the cursor corresponding to the terminal device when the voice information is received and played.

15. The method according to claim 14, wherein the access address comprises an encoded image;

the generating the access request according to the access address and sending the access request to the display device comprises:

decoding the encoded image, and generating the access request according to decoded information, and sending the access request to the display device.

16. The method according to claim 14, wherein the method further comprises:

sending a cursor display request to the display device, so that the cursor corresponding to the terminal device is generated by the display device according to the cursor display request.

17. The method according to claim 14, wherein the obtaining the access address of the display device comprises:

obtaining the access address of the display device by using a third-party platform.

18. An electronic device, comprising a display screen and a processor, wherein the processor is configured to execute the interaction method between the display device and the terminal device according to claim 1.

19. A computer readable storage medium on which a computer program is stored, wherein the program, when executed by a processor, implements the interaction method between the display device and the terminal device according to claim 1.

* * * * *